(12) United States Patent
Ramirez Angulo et al.

(10) Patent No.: US 11,001,740 B2
(45) Date of Patent: May 11, 2021

(54) ADDITIVES TO REDUCE THE CRYSTALLIZATION TEMPERATURE OF BRINES AND METHODS OF USE

(71) Applicant: HALLIBURTON ENERGY SERVICES, Houston, TX (US)

(72) Inventors: Jessica Paola Ramirez Angulo, Kingwood, TX (US); Chesnee Lae Davis, Spring, TX (US); Jay Paul Deville, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 26 days.

(21) Appl. No.: 16/468,274

(22) PCT Filed: Jan. 10, 2017

(86) PCT No.: PCT/US2017/012877
§ 371 (c)(1),
(2) Date: Jun. 10, 2019

(87) PCT Pub. No.: WO2018/132089
PCT Pub. Date: Jul. 19, 2018

(65) Prior Publication Data
US 2020/0079989 A1    Mar. 12, 2020

(51) Int. Cl.
| C09K 8/06 | (2006.01) |
| C09K 8/506 | (2006.01) |
| C09K 8/52 | (2006.01) |
| C09K 8/575 | (2006.01) |
| C09K 8/60 | (2006.01) |

(Continued)

(52) U.S. Cl.
CPC ............... *C09K 8/06* (2013.01); *C09K 8/506* (2013.01); *C09K 8/52* (2013.01); *C09K 8/575* (2013.01); *C09K 8/607* (2013.01); *C09K 8/68* (2013.01); *C09K 8/74* (2013.01); *C09K 8/86* (2013.01);
(Continued)

(58) Field of Classification Search
None
See application file for complete search history.

(56) References Cited

U.S. PATENT DOCUMENTS

| 5,643,858 A | * | 7/1997 | Woolley | ................. | C09K 8/845 507/140 |
| 6,635,604 B1 | | 10/2003 | Halliday et al. | | |

(Continued)

FOREIGN PATENT DOCUMENTS

| EP | 0119745 A2 | 9/1984 |
| EP | 0572113 A1 | 1/1993 |

(Continued)

OTHER PUBLICATIONS

International Search Report and Written Opinion; PCT Application No. PCT/US2017/012877; dated Jan. 10, 2017.

(Continued)

*Primary Examiner* — Jeffrey D Washville
(74) *Attorney, Agent, or Firm* — Polsinelli PC (57) ABSTRACT

A composition of a treatment fluid having an aqueous base fluid and a true crystallization temperature reduction additive. A method includes providing a treatment fluid having an aqueous base fluid, adding a true crystallization temperature reduction additive and placing the treatment fluid in a subterranean wellbore.

20 Claims, 2 Drawing Sheets

(51) Int. Cl.
*C09K 8/68* (2006.01)
*C09K 8/74* (2006.01)
*C09K 8/86* (2006.01)
*E21B 43/04* (2006.01)
*E21B 43/267* (2006.01)

(52) U.S. Cl.
CPC ............ *E21B 43/04* (2013.01); *E21B 43/267* (2013.01); *C09K 2208/12* (2013.01)

(56) References Cited

U.S. PATENT DOCUMENTS

| | | |
|---|---|---|
| 2005/0101491 A1 | 5/2005 | Vollmer |
| 2005/0153845 A1 | 7/2005 | Walker |
| 2008/0135302 A1* | 6/2008 | Zhang .................. C09K 8/36 175/70 |
| 2014/0202695 A1* | 7/2014 | Suryawanshi ......... C09K 8/514 166/278 |
| 2016/0115376 A1* | 4/2016 | Nasr-El-Din ............ C09K 8/52 507/241 |
| 2017/0233630 A1* | 8/2017 | Nalepa .................... C09K 8/05 507/145 |

FOREIGN PATENT DOCUMENTS

| | | |
|---|---|---|
| GB | 2089397 A | 6/1982 |
| WO | 9316144 A1 | 8/1993 |
| WO | 2016025137 A1 | 2/2016 |
| WO | 2016196332 A1 | 12/2016 |

OTHER PUBLICATIONS

Rapp, Edward et al.; AADE-16-FTCE-89; "Innovative High-Density, Non-Zinc, Solids-Free Completion Fluid for Ultra Deepwater Environments"; 2016.

* cited by examiner

ADDITIVES TO REDUCE THE CRYSTALLIZATION TEMPERATURE OF BRINES AND METHODS OF USE

CROSS-REFERENCE TO RELATED APPLICATIONS

None.

FIELD

The present disclosure relates generally to fluids used in the drilling, completion and remedial operations of a wellbore in a subterranean formation. More particularly, the present disclosure relates to methods of increasing the density of solids-free fluids using in drilling, completion, and workover operations to greater than 14.2 lb/gal.

BRIEF DESCRIPTION OF DRAWINGS

The accompanying views of the drawing are incorporated into and form a part of the specification to illustrate several aspects and examples of the present disclosure, wherein like reference numbers refer to like parts throughout the figures of the drawing. These figures together with the description serve to explain the general principles of the disclosure. The figures are only for the purpose of illustrating examples of how the various aspects of the disclosure can be made and used and are not to be construed as limiting the disclosure to only the illustrated and described examples.

DETAILED DESCRIPTION

Drilling rigs used for the drilling of oil and gas wells typically include a supportive rig floor positioned over a well. A derrick extending vertically above the rig floor supports a traveling block which can be raised and lowered within the derrick, the traveling block supporting a tubular drill string. During drilling operations, a drill bit on the end of the drill string is conveyed into a well and is manipulated within the well via the drill pipe. The drill pipe is raised and lowered within the well utilizing the drilling rig derrick.

When installing drill pipe or other tubular pipe into a well, such pipe is typically installed in a number of sections of roughly equal length called "joints". As such pipe penetrates farther and farther into a well, additional joints of pipe must be added to the ever lengthening "string" or "drillstring" in the rig derrick. Thus, a typical drillstring comprises a plurality of sections or joints of pipe, each of which has an internal, longitudinally extending bore. During drilling operations, a drill bit along with other desired equipment is attached to the lower or distal end of said drill string.

In the most basic sense, rotary drilling operations typically involve attaching a drill bit on a lower end of a drillstring to form a drilling tool and rotating the drill bit along with the drillstring into a subterranean formation to create a well bore through which subsurface formation fluids may be recovered. In another method of drilling, coiled tubing may be used instead of jointed pipe and the drill bit may be rotated using a downhole motor rather than rotating the entire drill string.

During drilling operations, a fluid known as drilling mud or drilling fluid is normally pumped down the internal bore of the drill pipe, and circulated up the annular space which is formed between the external surface of said drill pipe and the internal surface of the wellbore. The basic functions of drilling mud are: (1) to cool and lubricate the drill bit and downhole equipment during drilling operations; (2) to transport pieces of drilled-up rock and other debris from the bottom of the hole to the surface; (3) to suspend such rock and debris during periods when circulation is stopped; (4) to provide hydrostatic pressure to control encountered subsurface pressures; and (5) to seal the porous rock in the well with an impermeable filter cake.

Drilling mud is often a base fluid containing solids in suspension, such as a water based mud having barite as its primary weighting agent. The drilling mud is weighted to provide a desired hydrostatic pressure at a known depth. As the circulated drilling mud returns to the earths surface and is pumped out of a well, the mud contains pieces of broken, drilled-up rock and other solid debris known as "cuttings" or "drill cuttings". In most cases, an effluent mud stream flowing out of a well, together with associated drill cuttings, is directed to one or more devices which are designed to separate such drill cuttings from the mud. Such devices include, but are not limited to, shale shakers, desanders, desilters, hydrocyclones and centrifuges.

In some instances the solids laden drilling mud can be displaced with a solids free fluid, which can be referred to as a "drill in fluid", prior to drilling through a prospective production zone. This can enable the drilling of the prospective production zone with minimal zone contamination from the solids and other materials that are contained within the solids laden drilling mud.

Once the wellbore is drilled it is common to displace the solids laden drilling mud within the wellbore with a solids free completion fluid, to minimize the amount of particulates that may be introduced into the formation during completion operations. After a well has been completed it may be necessary to perform remedial work on the well, which may include the use of a solids free workover fluid. As used herein the terms drilling fluid, completion fluid, and workover fluid may all be used or the generic term treatment fluid may be used to refer to fluids of the present disclosure.

To provide the same hydrostatic pressure as the solids laden drilling fluid the completion fluid must have a sufficient density. Historically, zinc bromide and/or cesium formate brines have been used to prepare solids-free drilling, completion, and workover fluids with densities greater than 14.2 lb/gal (1.70 kg/L). While both fluids have high cost associated with them, zinc brines are known to be environmentally hazardous. Calcium bromide brines can be prepared at densities greater than 14.2 lb/gal (up to 15.5 lb/gal) and manganese bromide (II) brines can be prepared at densities greater than 14.2 lb/gal (up to 17.0 lb/gal); but these brines suffer from crystallization temperatures that are too high for some operations.

True Crystallization Temperature (TCT) of a brine is the temperature at which a solid phase begins to form at atmospheric pressure, resulting in a mixture of solid particles and solution. TCT is an important property of well construction and intervention fluids used in cold weather conditions and/or under high pressure. The effect of pressure can be significant under conditions involving a combination of high pressure and low temperature; such as in deepwater applications at seabed or when pressure testing in colder climates; the crystallization temperature observed under pressurized conditions is known as the Pressurized Crystallization Temperature (PCT). Under these conditions, brines may crystallize at a temperature higher than the expected TCT, possibly varying by as much as 20° F. to 40° F. For example, a calcium bromide aqueous brine of about 14.2 lb/gal (1.70 kg/L) has a TCT of 10° F. (−12.2° C.). A calcium bromide aqueous brine of about 15 lb/gal (1.8 kg/L) has a TCT of about 61° F. (16.1° C.). These higher density brines are not suitable for use in some applications, because precipitation will occur due to their relatively high TCT. Aqueous brines of density above 14.2 lb/gal can be obtained by blending enough zinc bromide into the calcium bromide aqueous brines until the desired density is reached. Zinc containing calcium bromide aqueous brines can have a TCT of about 20° F. (−6.7° C.) or lower, making them more suitable for downhole use. However, the inclusion of zinc leads to increased cost, increased reporting to governmental agencies and stricter environmental measures.

The challenge is to provide a high-density, zinc-free and/or cesium-free aqueous brine fluid for use as drilling, completion, workover, packer, and/or perforating fluid that is based on calcium bromide and/or manganese bromide but has a suitably low crystallization temperature. Accordingly, a need exists for high-density, zinc-free, and/or cesium-free aqueous brine fluid for use as a treatment fluid, such as those based on calcium bromide, manganese (II) bromide or calcium chloride, but has suitably low crystallization temperatures.

The present disclosure provides a method for the preparation of zinc and/or cesium free brines having densities greater than 14.2 lb/gal that possess operationally-acceptable True Crystallization Temperature (TCT).

Additives have been identified that lower the crystallization temperature of calcium bromide, calcium chloride, and/or manganese (II) bromide brines. A non-limiting listing of additives identified are: certain polar molecules capable of hydrogen bonding such as: formamide and urea; multidentate organic ligands such as: ethylenediaminetetraacetic acid (EDTA) and N-(Phosphonomethyl)iminodiacetic acid (PMIDA) and the group of hydroxy carboxylic acids (HCAs) such as; tartaric acid, gluconic acid, citric acid and malic acid.

For example, a calcium bromide brine of a density of 14.8 lb/gal has a literature value for the TCT of 50° F. (10° C.), which would be too high for most operations. The addition of the additives of the present disclosure resulted in significant reductions of the TCT.

In certain embodiments the compositions of the present disclosure have densities of about 14.3 ppg (1.71 kg/L) or more. In embodiments the compositions have densities of about 14.6 ppg (1.75 kg/L) or more. In embodiments the compositions have densities of about 14.8 ppg (1.77 kg/L) or more. In embodiments the compositions have densities of about 15.0 ppg (1.80 kg/L) or more. In embodiments the compositions have densities of about 15.1 ppg (1.81 kg/L) or more. In embodiments the compositions have densities of about 16.0 ppg (1.92 kg/L) or more. In embodiments the compositions have densities of about 17.0 ppg (2.04 kg/L) or more In an embodiment this solution can be implemented at a liquid mud plant by taking a stock brine, such as for example a calcium bromide stock brine, neutralizing it with lime, and then adding the amount of TCT reducing additive needed based on a target density. This treatment fluid will then be mixed for a short period of time and the additional salt (in its dry form) will be added to achieve the target density.

The solutions and methods of the present disclosure are applicable in drilling wells as a drill-in-fluid, for newly-drilled formation completions, and in formations requiring re-stimulation, such as with the drilling of additional lateral extensions of the wellbore. The solutions and methods of the present disclosure can be applicable to certain drilling fluids, completion fluids, and workover fluids such as perforating, gravel packing and fracturing fluids.

Figure 1:
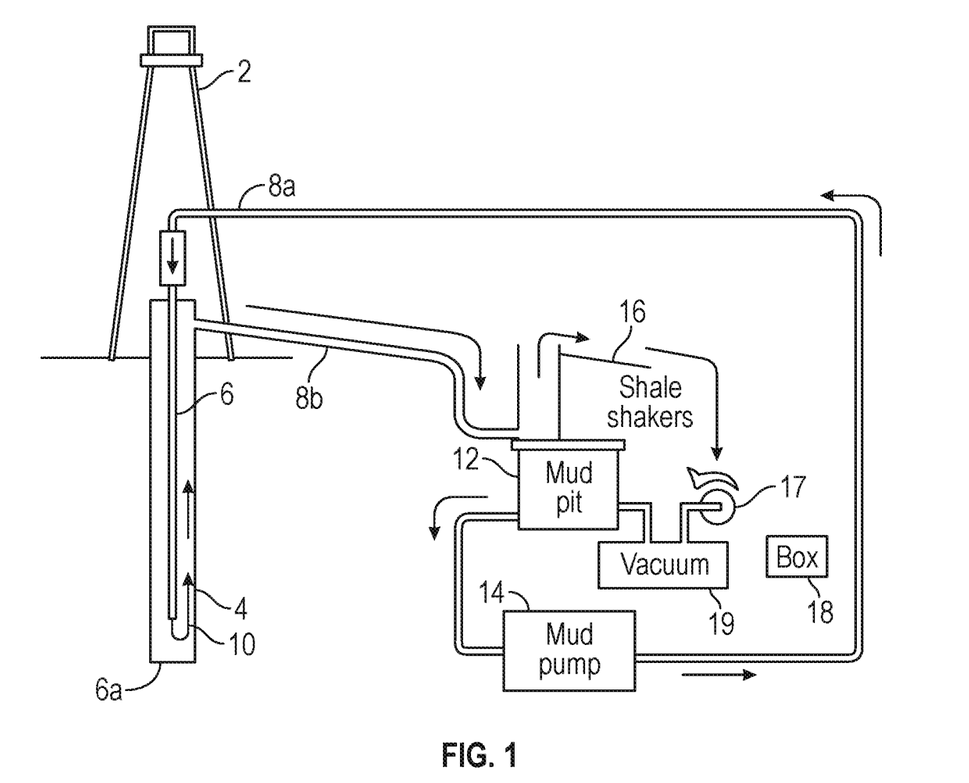
FIG. 1 is a diagram illustrating an example of a wellbore drilling mud system that may be used in accordance with certain embodiments of the present disclosure.

Referring to the drawings, FIG. 1 depicts a schematic representation of the mud system of a typical drilling rig. The flow of drilling mud within this mud system in FIG. 1 is generally in the direction of the arrows. A derrick 2 extends vertically over wellbore 4. Tubular work string 6 is inserted into wellbore 4, and extends from the earth's surface to a desired depth within the wellbore 4. Flow line 8a is connected to the tubular work string 6. Flow line 8b is connected to the annular space 10 formed between the outer surface of tubular work string 6 and the inner surface of wellbore 4. The bulk of the drilling mud for the depicted mud system is in the mud pit 12. Mud from the mud pit 12 is circulated through the overall mud system depicted schematically in FIG. 1 via mud pump 14. During typical drilling operations, mud is pumped into tubular work string 6 through flow line 8a, circulated out the bottom end 6a of work string 6, up the annulus 10 of wellbore 4, and out of the wellbore annulus 10 via flow line 8b.

During standard drilling operations, mud exiting the wellbore annulus 10 through flow line 8b often includes drill cuttings and other debris encountered in wellbore 4. Such drill cuttings are generated downhole as a result of the drilling process. Such drill cuttings and other debris would typically contaminate the overall quality of the mud system if allowed to remain in the active mud system. Accordingly, the mud and drill cuttings mixture leaving the well is directed to a separation device, such as shale shakers 16. As the combined mixture of drilling mud and drill cuttings are directed over shale shakers 16, much of the "free" liquid mud passes through the screens of the shale shakers 16 and is directed into the mud pit 12. Although such "free" liquids are separated at the shale shakers, the drill cuttings still frequently contain entrained and/or adherent fluids. These drill cuttings pass over shale shakers 16 and can then be discharged from the shale shakers 16 to an optional separation apparatus 17 and can then be discharged and contained in a collection box 18. The optional separation apparatus 18 can include, or work in conjunction with, a vacuum 19. Drilling fluid that is separated from the separation apparatus 17 and vacuum 19 can then be sent back to the mud pit 12 for further use.

Figure 2:
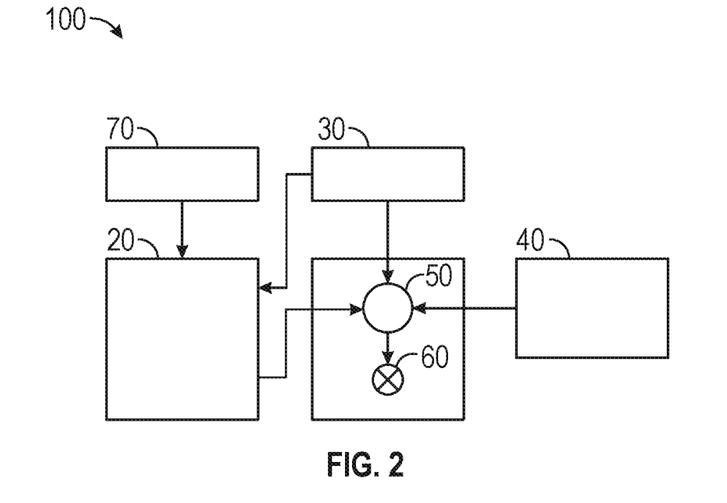
FIG. 2 is a diagram illustrating an example of a fracturing system that may be used in accordance with certain embodiments of the present disclosure.

In FIG. 2, the disclosed methods and compositions may directly or indirectly affect one or more components or pieces of equipment associated with an exemplary well treating system 100, according to one or more embodiments. In certain instances, the system 100 includes a treatment fluid producing apparatus 20, a fluid source 30, a proppant or sand source 40, and a pump and blender system 50 and resides at the surface at a well site where a well 60 is located. In certain instances, the treatment fluid producing apparatus 20 combines a gel pre-cursor with fluid (e.g., liquid or substantially liquid) from fluid source 30, to produce a hydrated gelled fluid that is used to fracture the formation or gravel pack a portion of the well. The hydrated gelled fluid can be a fluid for ready use in treatment of the well 60 or a concentrate to which additional fluid is added prior to use in treatment of the well 60. In other instances, the treatment fluid producing apparatus 20 can be omitted and the gelled fluid sourced directly from the fluid source 30. In certain instances, the treatment fluid may comprise water, a hydrocarbon fluid, a polymer gel, foam, air, wet gases and/or other fluids.

The sand source 40 can include a proppant for combination with a fracturing fluid or sand for use in a gravel pack operation. The system may also include additive source 70 that provides one or more additives (e.g., gelling agents, weighting agents, and/or other optional additives) to alter the properties of the treatment fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the treatment fluid and can combine it with other components, including sand from the sand source 40 and/or additional fluid from the additives 70. The resulting mixture may be pumped down the well 60 under a pressure sufficient to displace drilling mud from the well and substitute a solids free treatment fluid. Notably, in certain instances, the treatment fluid producing apparatus 20, fluid source 30, and/or proppant source 40 may be equipped with one or more metering devices (not shown) to control the flow of fluids, sand, and/or other compositions to the pumping and blender system 50. Such metering devices may permit the pumping and blender system 50 can source from one, some or all of the different sources at a given time, and may facilitate the preparation of treatment fluids in accordance with the present disclosure using continuous mixing or "on-the-fly" methods. Thus, for example, the pumping and blender system 50 can provide just treatment fluid into the well at some times, just sand at other times, and combinations of those components at yet other times.

Figure 3:
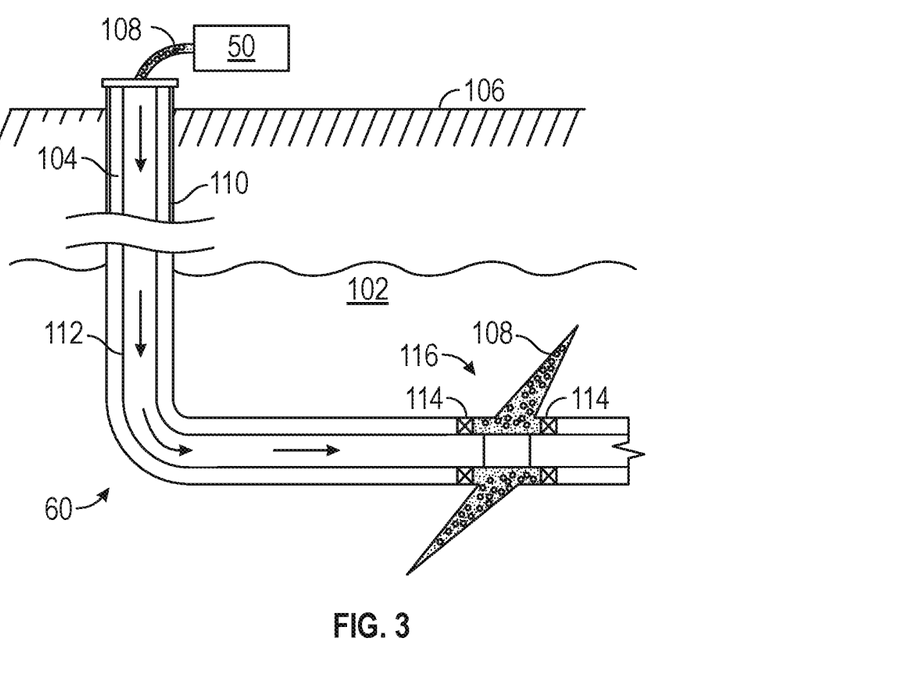
FIG. 3 is an elevational view of a wellbore illustrating an example of a subterranean formation in which a fracturing operation may be performed in accordance with certain embodiments of the present disclosure.

FIG. 3 shows an elevational view of a well 60 during a fracturing operation in a portion of a subterranean formation of interest 102 surrounding a well bore 104. The well bore 104 extends from the surface 106, and a fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 descending from the surface 106 into the well bore 104. The pump and blender system 50 is coupled to a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 3 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the well treating system 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Figure 4:
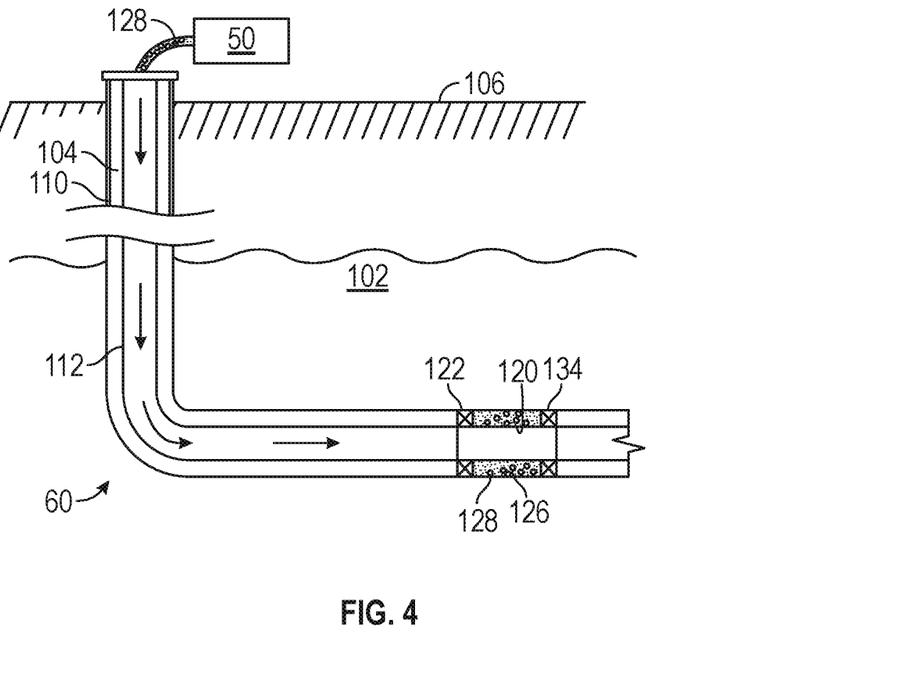
FIG. 4 is an elevational view of a wellbore illustrating an example of a subterranean formation in which a gravel pack operation may be performed in accordance with certain embodiments of the present disclosure.

FIG. 4 shows an elevational view of a well 60 during a gravel pack operation adjacent a portion of a subterranean formation of interest 102 surrounding a well bore 104. The well bore 104 extends from the surface 106. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. In cased wells, perforations can be formed using shape charges, a perforating gun, hydro-jetting and/or other tools.

The well is shown with a work string 112 descending from the surface 106 into the well bore 104. A gravel pack screen 120 is located on the distal end of the working string 112 and is shown with an upper packer 122 and a lower packer 124 which define an annulus area 126 between the gravel pack screen 120 and the casing 110. The pump and blender system 50 is coupled to the work string 112 to pump a gravel pack fluid 128 through the working string 112. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the annulus area 126 between the gravel pack screen 120 and the casing 110. For example, the working string 112 may include ports to communicate the gravel pack fluid 128 into an annulus area 126 between the gravel pack screen 120 and the casing 110.

It is often useful to include one or more optional additives in aqueous brine, and inclusion of such additives is within the scope of the disclosure. Optional additives can include, for example, corrosion inhibitors, lubricants, pH control additives, surfactants, and/or solvents. The pH of a zinc and/or cesium free aqueous brine can be adjusted by adding an acid or a base as needed. Suitable acids include mineral acids and water-soluble organic acids. Suitable bases can be inorganic oxides and/or hydroxides and/or amines.

Suitable aqueous-based fluids may, in some embodiments, include, but are not limited to, fresh water, saltwater (e.g., water containing one or more salts dissolved therein), brine (e.g., saturated salt water), seawater, acidic aqueous fluids, basic aqueous fluids, and any combination thereof.

Suitable aqueous-miscible fluids may be included in the treatment fluid and may, in some embodiments, include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, potassium carbonate, sodium formate, potassium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and any combination thereof. In some embodiments, any of the foregoing aqueous-miscible fluids or combinations thereof may be used in combination with any of the foregoing aqueous-based fluids or combinations thereof.

In some embodiments, the treatment fluids of the present disclosure may optionally further include viscosifying agents, which may be useful in adjusting the base-viscosity of the treatment fluid. The viscosifying agents suitable for use in conjunction with the present disclosure may comprise any substance (e.g., polymeric materials, crosslinked or otherwise) capable of increasing the viscosity of the treatment fluid.

Suitable polymeric viscosifying agents for use in conjunction with the present disclosure may, in some embodiments, include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may, in some embodiments, include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof. In certain embodiments, the polymeric viscosifying agents may comprise an organic carboxylated polymer, such as CMHPG.

Suitable synthetic polymers for use in conjunction with the present disclosure may, in some embodiments, include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octyl ammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the polymeric viscosifying agent comprises an acrylamide/2-(methacryloyloxy) ethyltrimethylammonium methyl sulfate copolymer. In certain embodiments, the polymeric viscosifying agent may comprise an acrylamide/2-(methacryloyloxy)ethyltrimethylammonium chloride copolymer. In certain embodiments, the polymeric viscosifying agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as polymeric viscosifying agents.

Viscosifying agents may be present in the treatment fluids described herein in an amount sufficient to provide the desired viscosity. In some embodiments, the viscosifying agents may be present in an amount ranging from a lower limit of about 0.1%, 0.15%, or 1% by weight of the treatment fluid to an upper limit of about 10%, 5%, or 2.5% by weight of the treatment fluid, and wherein the amount may range from any lower limit to any upper limit and encompass any subset there between.

As illustrated in the present disclosure, treatment fluids described herein may be utilized in a plurality of subterranean operations. Examples of suitable subterranean operations that can utilize the treatment fluids described herein may include, but are not limited to, drilling operations, lost circulation operations, stimulation operations, sand control operations, completion operations, cementing operations, acidizing operations, scale inhibiting operations, water-blocking operations, clay stabilizer operations, fracturing operations, frac-packing operations, gravel packing operations, wellbore strengthening operations, and sag control operations. The methods and compositions of the present disclosure may be used in full-scale operations or pills. As used herein, a "pill" is a type of relatively small volume of specially prepared treatment fluid placed or circulated in the wellbore.

In an embodiment the disclosure further includes performing a subterranean operation which can be: drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, displacement of solids laden fluid, and the like, or combinations thereof.

An embodiment of the present disclosure is a method that includes providing a treatment fluid having an aqueous base fluid and a TCT reduction additive and placing the treatment fluid in a subterranean wellbore wherein the TCT reduction additive enables the treatment fluid to have a higher density that can be used in regions of the subterranean formation without the fear of crystallization particulate formation. The embodiment can include the mixing of the treatment fluid using mixing equipment and can also include introducing the treatment fluid into a subterranean formation using one or more pumps.

An embodiment of the present disclosure is an aqueous composition that includes an aqueous base fluid having a first TCT and a TCT reduction additive that combined with the base fluid forms an aqueous composition with a density of at least 14.2 lb/gal and a second TCT at least 9° F. (5° C.) less than the composition without the TCT reduction additive. The aqueous base fluid can be selected from a calcium bromide brine, a calcium chloride brine, a manganese (II) bromide brine, and combinations thereof. The TCT reduction additive can be chosen from formamide, urea, a multidentate organic ligand, a hydroxy carboxylic acid, and combinations thereof. In an embodiment the hydroxy carboxylic acids (HCAs) can be chosen from tartaric acid, gluconic acid, citric acid, malic acid, and combinations thereof. In an embodiment the multidentate organic ligands are chosen from ethylenediaminetetraacetic acid (EDTA), N-(Phosphonomethyl)iminodiacetic acid (PMIDA), and combinations thereof. In an embodiment the TCT reduction additive is PMIDA which is reacted with aqueous sodium hydroxide and used as a di-sodium acetate salt. In an embodiment the TCT reduction additive is EDTA reacted with aqueous sodium hydroxide and used as a tetra-sodium acetate salt. The compositions can have a density of at least 14.2 lb/gal and a TCT reduction of at least 12° F. (6.7° C.) as compared with the composition without the TCT reduction additive. In optional embodiments the TCT reduction can be at least 15° F. (8.3° C.), at least 20° F. (11.1° C.), or at least 25° F. (13.9° C.). In an optional embodiment the composition is zinc free. In an optional embodiment the composition is cesium free.

An embodiment of the present disclosure is an aqueous composition that includes an aqueous base fluid having a first TCT and a TCT reduction additive (second TCT) that combined with the base fluid forms an aqueous composition with a density of at least 14.2 lb/gal and a second TCT at least 9° F. (5° C.) less than the composition without the TCT reduction additive. The aqueous base fluid can be selected from the group of a calcium bromide brine, a calcium chloride brine, a manganese (II) bromide brine, and combinations thereof. The TCT reduction additive can be chosen from formamide; urea; a multidentate organic ligand chosen from the group consisting of: ethylenediaminetetraacetic acid (EDTA), N-(Phosphonomethyl)iminodiacetic acid (PMIDA), and combinations thereof; a hydroxy carboxylic acid chosen from the group consisting of: tartaric acid, gluconic acid, citric acid, malic acid, and combinations thereof; and combinations thereof. In an optional embodiment the composition is zinc free. In an optional embodiment the composition is cesium free.

An embodiment of the present disclosure is a method that includes providing an aqueous based treatment fluid, adding a TCT reduction additive to lower the treatment fluid crystallization temperature by at least 9° F. and placing the treatment fluid in a subterranean well. The TCT reduction additive can be chosen from formamide; urea; a multidentate organic ligand chosen from the group consisting of: ethylenediaminetetraacetic acid (EDTA), N-(phosphonomethyl) iminodiacetic acid (PMIDA), and combinations thereof; a hydroxy carboxylic acid chosen from the group consisting of: tartaric acid, gluconic acid, citric acid, malic acid, and combinations thereof; and combinations thereof. The method can also include performing a subterranean operation. The subterranean operation can be drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, and combinations thereof. Optionally the method includes placing the treatment fluid in a subterranean well using one or more pumps. Optionally the method mixing the treatment fluid using mixing equipment. Optionally the method includes displacing solids laden drilling fluid from the subterranean well with the treatment fluid.

EXAMPLES

Formamide

Formamide can be added to a brine base fluid at concentrations by volume of 1 to 10%, resulting in a reduction in the TCT values in the range of 10° F. to 25° F. (5.6° C. to 13.9° C.). For example, a 14.8 lb/gal (1.77 kg/L) $CaBr_2$ brine containing 7%/v of formamide was found to have a TCT of 31.3° F. (−0.4° C.), which is a reduction of 18.7° F. (10.4° C.) over the same density brine without the formamide.

PMIDA

PMIDA was reacted with aqueous sodium hydroxide and used as the di-sodium acetate salt. PMIDA can be added to a brine base fluid at concentrations by weight of 0.1 to 5%, resulting in a reduction in the TCT values in the range of 2° F. to 27° F. (1.1° C. to 15.0° C.). For example, a 14.8 lb/gal (1.77 kg/L) $CaBr_2$ brine containing 1.2%/w of PMIDA was found to have a TCT of 23.2° F. (−4.9° C.), which is a reduction of 26.8° F. (14.9° C.) over the same density brine without the TCT reducing additive.

EDTA

EDTA was reacted with aqueous sodium hydroxide and used as the tetra-sodium acetate salt. EDTA can be applied at concentrations by weight of 0.1 to 2%, showing a reduction in the TCT values in the range of 5° F. to 20° F. For example, a 14.8 lb/gal (1.77 kg/L) $CaBr_2$ brine containing 7%/v of a 16%/w aqueous solution of EDTA was found to have a TCT of 34.7° F. (1.5° C.), which is a reduction of 15.3° F. (8.5° C.) over the same density brine without the TCT reducing additive.

Tartaric Acid

Tartaric acid can be applied at concentrations by weight of 1 to 15, 15 to 31, 31 to 45, 46 to 60 and/or 61 to 75% showing a reduction in the TCT values in the range of 5° F. to 15° F., 16° F. to 30° F., 31° F. to 45° F., 46° F. to 60° F., 61° F. to 75° F. and 76° F. to 90° F. For example, a 14.8 lb/gal (1.77 kg/L) $CaBr_2$ brine containing 10%/w of Tartaric Acid was found to have a TCT of 22.8° F. (−5.1° C.), which is a reduction of 27.2° F. (15.1° C.) over the same density brine without the tartaric acid.

Citric Acid

Citric acid can be applied at concentrations by weight of 1 to 15, 16 to 31 and 31 to 45% showing a reduction in the TCT values in the range of 5° F. to 15° F., 16° F. to 30° F. and 31° F. to 45° F. For example, a 14.8 lb/gal (1.77 kg/L)

$CaBr_2$ brine containing 10%/w of citric Acid was found to have a TCT of 36.8° F. (2.7° C.), which is a reduction of 13.2° F. (7.3° C.) over the same density brine without the citric acid.

Gluconic Acid

Gluconic acid can be applied at concentrations by weight of 1 to 15, 16 to 31, 31 to 45, 46 to 60, or 61 to 75% showing a reduction in the TCT values in the range of 5° F. to 15° F., 16° F. to 30° F., 31° F. to 45° F., 46° F. to 60° F., 61° F. to 75° F. and 76° F. to 90° F. For example, a 14.8 lb/gal (1.77 kg/L) $CaBr_2$ brine containing 10%/w of Gluconic Acid was found to have a TCT of 24.6° F. (-4.1° C.), which is a reduction of 25.4° F. (14.1° C.) over the same density brine without the gluconic acid.

Malic Acid

Malic acid can be applied at concentrations by weight of 1 to 15, 16 to 31 and 31 to 45% showing a reduction in the TCT values in the range of 5° F. to 15° F., 16° F. to 30° F. and 31° F. to 45° F. For example, a 14.8 lb/gal (1.77 kg/L) $CaBr_2$ brine containing 10%/w of Malic Acid was found to have a TCT of 34.2° F. (1.2° C.), which is a reduction of 15.8° F. (8.8° C.) over the same density brine without the malic acid.

Carbamide (Urea)

Urea was dissolved in water. Urea can be applied at concentrations by weight of 0.1 to 4 and 4.1 to 8% showing a reduction in the TCT values in the range of 10° F. to 25° F. For example, a 14.8 lb/gal (1.77 kg/L) $CaBr_2$ brine containing 10%/v of a 40%/w aqueous solution of urea was found to have a TCT of 34.7° F. (1.5° C.), which is a reduction of 15.3° F. (8.5° C.) over the same density brine without the urea.

As used herein the phrase "zinc free" shall mean that except for impurities, neither zinc nor zinc compounds are present in, or introduced into, the compositions or processes of this disclosure. Generally, there is about 5 ppm or less of zinc present in the aqueous brines of this disclosure.

As used herein the phrase "cesium free" shall mean that except for impurities, neither cesium nor cesium compounds are present in, or introduced into, the compositions or processes of this disclosure.

The term ppm means parts per million (wt/wt), as used throughout, unless specifically stated otherwise. Throughout both "ppg" and "lb/gal" are abbreviations for pounds per gallon.

The abbreviation "TCT" herein means true crystallization temperature. True crystallization temperature is the temperature at which precipitate begins to form in the absence of supercooling.

Because the compositions disclosed herein can be used for clear completion fluids, precipitates and/or cloudiness in the aqueous brines are undesirable. To be suitable for use as well fluids, the aqueous brines have little or no precipitate formation over time (e.g. about one week) at ambient temperature and pressure or at elevated temperature and ambient pressure.

While the disclosure is susceptible to various modifications and alternative forms, specific embodiments thereof will be described in detail and shown by way of example. It should be understood, however, that it is not intended to limit the disclosure to the particular forms disclosed, but, on the contrary, the disclosure is to cover all modifications and alternatives falling within the scope of the disclosure as expressed in the appended claims. The compositions can comprise, consist essentially of, or consist of the stated materials. The methods can comprise, consist essentially of, or consist of the stated steps with the stated materials.

The various embodiments of the present disclosure can be joined in combination with other embodiments of the disclosure and the listed embodiments herein are not meant to limit the disclosure. All combinations of various embodiments of the disclosure are enabled, even if not given in a particular example herein.

While illustrative embodiments have been depicted and described, modifications thereof can be made by one skilled in the art without departing from the scope of the disclosure. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples.

A treatment fluid may be used in a variety of subterranean operations, such as for use as a completion, workover, packer, and/or perforating fluid. As used herein, the term "subterranean operation" is defined to mean any operation that requires the performance of some action or procedure below the surface of the earth, including, but not limited to, actions or procedures performed in the course of recovering oil, gas, and/or other substances from a formation below the surface of the earth. As used herein, the term "treatment," or "treating," does not imply any particular action by the fluid or any particular component thereof, but instead refers to any use related to a subterranean operation in conjunction with a desired function and/or for a desired purpose.

Numerous other modifications, equivalents, and alternatives, will become apparent to those skilled in the art once the above disclosure is fully appreciated. While embodiments of the disclosure have been shown and described, modifications thereof can be made by one skilled in the art without departing from the teachings of this disclosure. The embodiments described herein are exemplary only, and are not intended to be limiting. Many variations and modifications of the disclosure disclosed herein are possible and are within the scope of the disclosure.

Use of the term "optionally" with respect to any element of a claim is intended to mean that the subject element is required, or alternatively, is not required. Both alternatives are intended to be within the scope of the claim. It is intended that the following claims be interpreted to embrace all such modifications, equivalents, and alternatives where applicable. Other and further embodiments, versions and examples of the disclosure may be devised without departing from the basic scope thereof and the scope thereof is determined by the claims that follow.

What is claimed is:

1. An aqueous composition for use in a subterranean well comprising:
   an aqueous base fluid having a first true crystallization temperature; and
   a true crystallization temperature reduction additive that combined with the aqueous base fluid forms an aqueous composition having a second true crystallization temperature, the reduction additive comprising N-(phosphonomethyl)iminodiacetic acid (PMIDA);
   wherein the composition has a density of at least 14.2 lb/gal (1.70 kg/L) and the second true crystallization temperature is at least 9° F. (5° C.) less than the first true crystallization temperature.

2. The composition of claim 1, wherein the aqueous base fluid is selected from the group consisting of: a calcium bromide brine, a calcium chloride brine, a manganese (II) bromide brine, and combinations thereof.

3. The composition of claim 1, wherein the true crystallization temperature reduction additive is PMIDA reacted with aqueous sodium hydroxide and used as a di-sodium acetate salt.

4. The composition of claim 1, wherein the composition has a density of at least 14.2 lb/gal (1.70 kg/L) and the second true crystallization temperature is at least 12° F. (6.7° C.) less than the first true crystallization temperature.

5. The composition of claim 1, wherein the composition has a density of at least 14.2 lb/gal (1.70 kg/L) and the second true crystallization temperature is at least 15° F. (8.3° C.) less than the first true crystallization temperature.

6. The composition of claim 1, wherein the composition has a density of at least 14.2 lb/gal (1.70 kg/L) and the second true crystallization temperature is at least 20° F. (11.1° C.) less than the first true crystallization temperature.

7. The composition of claim 1, wherein the composition has a density of at least 14.2 lb/gal (1.70 kg/L) and the second true crystallization temperature is at least 25° F. (13.9° C.) less than the first true crystallization temperature.

8. The composition of claim 2, wherein the composition has a density of at least 14.8 lb/gal (1.77 kg/L) and the second true crystallization temperature is at least 20° F. (11.1° C.) less than the first true crystallization temperature; and wherein the true crystallization temperature reduction additive is chosen from the group consisting of: tartaric acid, gluconic acid, citric acid, malic acid, and combinations thereof.

9. The composition of claim 1, wherein the composition is zinc free.

10. The composition of claim 1, wherein the composition is cesium free.

11. An aqueous composition for use in a subterranean well comprising:
    an aqueous base fluid having a first true crystallization temperature; and
    a true crystallization temperature reduction additive that combined with the aqueous base fluid forms an aqueous composition having a second true crystallization temperature, the reduction additive comprising N-(Phosphonomethyl)iminodiacetic acid (PMIDA);
    wherein the composition has a density of at least 14.2 lb/gal (1.70 kg/L) and the second true crystallization temperature is at least 9° F. (5° C.) less than the first true crystallization temperature;
    wherein the aqueous base fluid is selected from the group consisting of: a calcium bromide brine, a calcium chloride brine, a manganese (II) bromide brine, and combinations thereof.

12. The composition of claim 11, wherein the composition is zinc free.

13. The composition of claim 11, wherein the composition is cesium free.

14. A method comprising:
    providing an aqueous base fluid having a first true crystallization temperature;
    adding a true crystallization temperature reduction additive to the aqueous base fluid to form an aqueous composition having a second true crystallization temperature at least 9° F. (5° C.) less than the first true crystallization temperature, the reduction additive comprising N-(phosphonomethyl)iminodiacetic acid (PMIDA); and
    placing the aqueous composition in a subterranean well.

15. The method of claim 14, further comprising performing a subterranean operation selected from the group comprising: drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, displacing solids laden drilling fluid, and combinations thereof.

16. An aqueous composition for use in a subterranean well comprising:
    an aqueous base fluid having a first true crystallization temperature, the aqueous base fluid being selected from the group of: a calcium bromide brine, a calcium chloride brine, a manganese (II) bromide brine, and combinations thereof; and
    a true crystallization temperature reduction additive that combined with the aqueous base fluid forms an aqueous composition having a second true crystallization temperature, the reduction additive being formamide or urea;
    wherein the composition has a density of at least 14.2 lb/gal (1.70 kg/L) and the second true crystallization temperature is at least 9° F. (5° C.) less than the first true crystallization temperature.

17. The aqueous composition of claim 16, wherein the reduction additive is present in a concentration of from 5% to 10% by weight of the aqueous composition.

18. An aqueous composition for use in a subterranean well comprising:
    an aqueous base fluid having a first true crystallization temperature, the aqueous base fluid being selected from the group of: a calcium bromide brine, a calcium chloride brine, a manganese (II) bromide brine, and combinations thereof; and
    a true crystallization temperature reduction additive that combined with the aqueous base fluid forms an aqueous composition having a second true crystallization temperature, the reduction additive being a hydroxy carboxylic acid and being present at a concentration of at least 10% to 45% by weight of the aqueous composition;

wherein the composition has a density of at least 14.2 lb/gal (1.70 kg/L) and the second true crystallization temperature is at least 9° F. (5° C.) less than the first true crystallization temperature.

19. The composition of claim 18, wherein the hydroxy carboxylic acid is chosen from the group consisting of: tartaric acid, gluconic acid, citric acid, malic acid, and combinations thereof.

20. The composition of claim 18, wherein the hydroxy carboxylic acid is tartaric acid.

* * * * *